US011737002B2

(12) United States Patent
Agarwal et al.

(10) Patent No.: US 11,737,002 B2
(45) Date of Patent: Aug. 22, 2023

(54) SELECTIVE CACHING OF PAIRWISE MASTER KEYS IN STREAMLINED ROAMING

(71) Applicant: HEWLETT PACKARD ENTERPRISE DEVELOPMENT LP, Houston, TX (US)

(72) Inventors: Piyush Agarwal, Santa Clara, CA (US); Sachin Ganu, Santa Clara, CA (US); Mohan Ram Bhadravati Ramakrishna Bhat, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 198 days.

(21) Appl. No.: 17/387,355

(22) Filed: Jul. 28, 2021

(65) Prior Publication Data
US 2023/0033287 A1 Feb. 2, 2023

(51) Int. Cl.
*H04W 36/08* (2009.01)
*H04W 36/30* (2009.01)
*H04W 12/06* (2021.01)

(52) U.S. Cl.
CPC ........... *H04W 36/08* (2013.01); *H04W 12/06* (2013.01); *H04W 36/30* (2013.01)

(58) Field of Classification Search
CPC ............... H04W 12/041; H04W 36/08; H04W 36/0038; H04W 12/04; H04W 12/0431; H04W 12/062; H04W 12/0433; H04W 36/0055; H04W 36/30; H04W 12/06; H04W 36/0016
See application file for complete search history.

(56) References Cited

U.S. PATENT DOCUMENTS

| | | | | |
|---|---|---|---|---|
| 2010/0173610 | A1* | 7/2010 | Kitazoe | H04W 12/0431 455/411 |
| 2014/0273958 | A1* | 9/2014 | Messana | H04L 63/0892 455/411 |
| 2017/0134940 | A1* | 5/2017 | Sharma | H04W 12/041 |
| 2018/0041927 | A1* | 2/2018 | Raval | H04W 36/0061 |
| 2018/0184345 | A1* | 6/2018 | Likar | H04W 12/0431 |
| 2020/0162906 | A1* | 5/2020 | Hu | H04W 36/08 |
| 2021/0337435 | A1* | 10/2021 | Zhao | H04W 12/0471 |

* cited by examiner

*Primary Examiner* — Allahyar Kasraian
(74) *Attorney, Agent, or Firm* — Sheppard Mullin Richter & Hampton LLP

(57) ABSTRACT

Systems and methods are provided for seamless roaming in a network. First, a client device is authenticated at a first access point of the network. Next, a processor selectively determines, among remaining access points in the network, second access points at which respective precursor keys, such as Pairwise Master Keys R1 (PMK-R1s) are to be computed. The second access points are determined based on any of respective path losses from the first access point to the second access points and respective historical frequencies at which the client device associates at the respective remaining access points. For the second access points, the respective PMK-R1s are computed and transmitted to the second access points to be cached. Next, following a request from the client device to reassociate to a second access point of the second access points, the client device is authenticated at the second access point based on a corresponding PMK-R1.

20 Claims, 9 Drawing Sheets

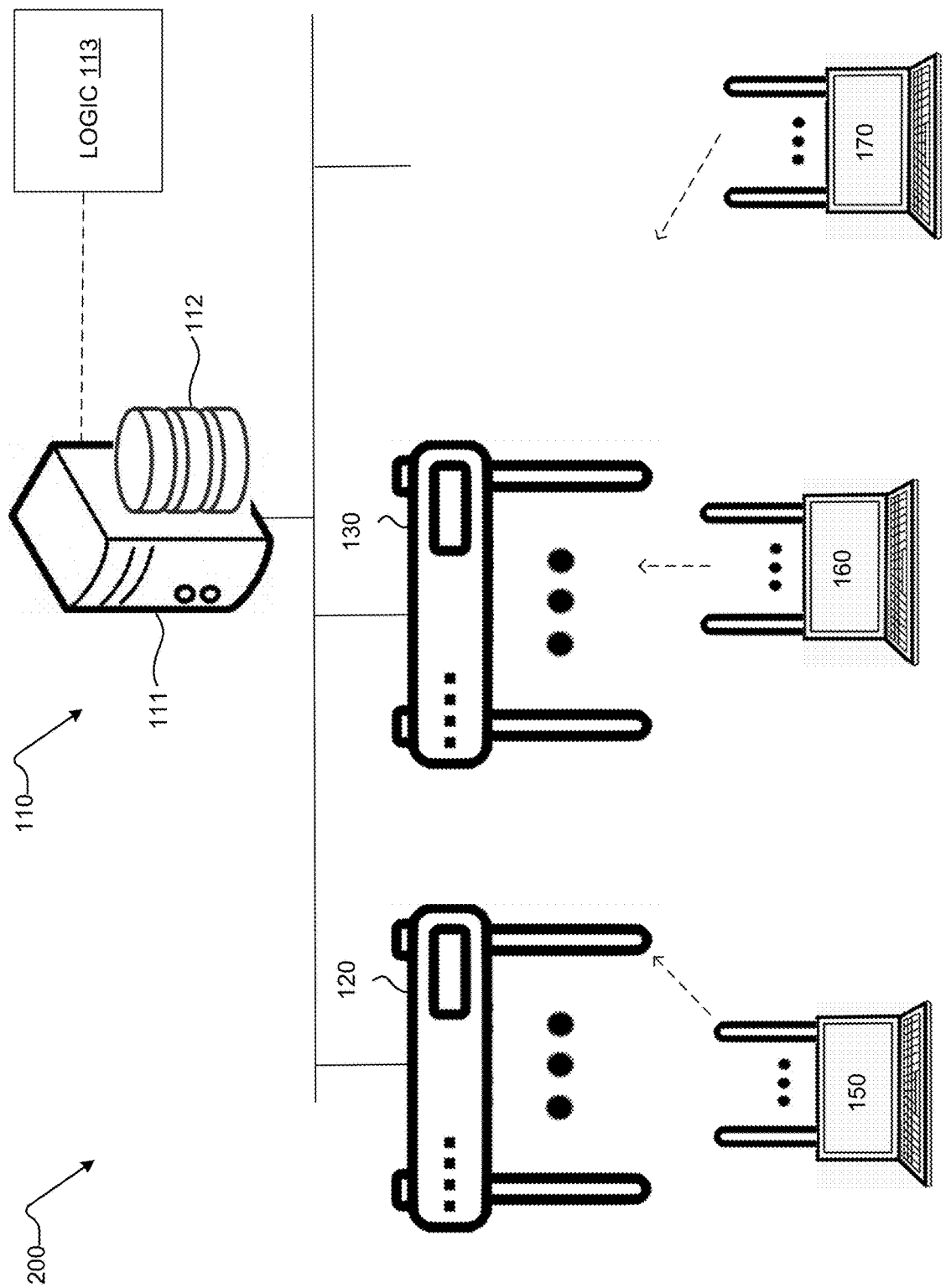

SELECTIVE CACHING OF PAIRWISE MASTER KEYS IN STREAMLINED ROAMING

BACKGROUND

Wireless networks have provided data into the palm of people's hands almost anywhere they move. The boon of wireless networks has been manifested by the skyrocketing growth of wireless data traffic. In 2018 alone, 28.58 trillion megabytes of data was exchanged, an increase of 82 percent over the amount of traffic exchanged in 2017 and an increase of 737 percent over the amount of traffic exchanged in 2010. Roaming provides the ability for client devices to seamlessly and securely connect to different network devices to receive and transmit data in different locations. In particular, when a client device moves beyond a range of a particular network device, that client device may connect to a different network device without interruption or delay. New functionalities in Wi-Fi Protected Access (WPA), including WPA2 and WPA3, may streamline an authentication procedure during roaming. In particular, a client device traditionally needs to be authenticated via IEEE 802.11x to an access point before exchanging data. However, during roaming in WPA2 and WPA3, that client device could exchange data with a different access point without undergoing a full authentication procedure because that different access point may already have stored some of the required encryption keys. Therefore, only a simplified procedure, a 4-way handshake, may be required in order to exchange data while roaming. However, one possible drawback of having to store some of the required encryption keys may include a computation cost of generating the encryption keys and a storage cost of storing the encryption keys.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

In FIG. 1C, a client device has reassociated to a new access point. The computing system updates its determination of which access points a precursor key is to be generated, following the reassociation of the client device.

FIG. 2 is an example of a computing system that facilitates roaming of client devices, according to embodiments described in the present disclosure. In FIG. 2, an access point previously part of a network has been excluded from the network, due to leaving, inactivation, or inoperability, for example. The computing system updates its determination of which access points a precursor key is to be generated at .

In FIG. 3, a new access point has entered a network. The computing system dates its determination of which access points a precursor key is to be generated at.

In FIG. 4, at least some of the access points include different radios that operate on different frequency bands.

FIG. 5 illustrates the generation, exchange, and authentication of additional keys following the precursor key.

Figure 1A:
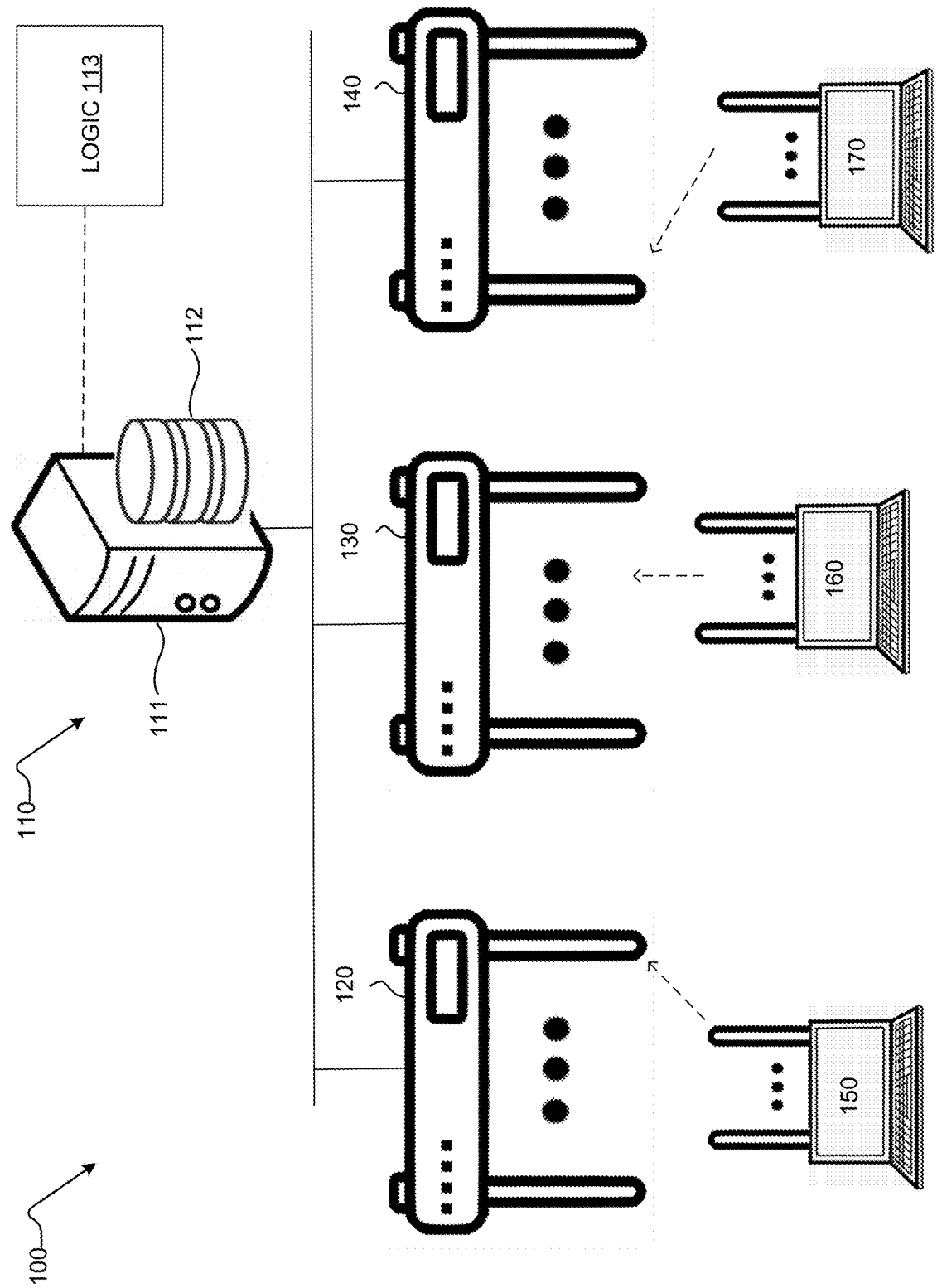
FIG. 1A is an example illustration of a computing system that facilitates roaming of client devices by reducing or eliminating a latency when a client device reassociates to a new access point, according to embodiments described in the present disclosure.

The figures are not exhaustive and do not limit the present disclosure to the precise form disclosed.

DETAILED DESCRIPTION

Certain aspects of streamlining roaming of client devices in a network, while conserving storage and/or computing resources at the access points, are described below. In particular, roaming may entail authentication of a client device at a new access point to which the client device is seeking to reassociate. The authentication may further include the computation, transmission, exchange, and verification of keys used in encrypting data that is exchanged between the client device and the access point. Sometimes, when a client device requests to reassociate to the new access point, the client device waits for the keys to be computed, thereby resulting in latencies. To reduce latencies, one of the precursor keys may be computed and stored at the new access point prior to the client device requesting to reassociate, in anticipation of such a request. Therefore, the client device does not need to wait for this key to be computed or derived at that new access point. However, this storing of the precursor key is selective, and based on a likelihood of the client device actually roaming to that access point, which may be determined based on a criteria of a distance, or path loss between the original access point and the new access point, and/or based on a historical frequency that the client device visits the new access point. Otherwise, if the precursor key were stored at every access point, and for every client device, a storage and computing footprint at the access points may be overwhelming. The description below elucidates a solution that provides streamlined roaming.

In particular, when a client device (e.g., supplicant) detects a decreasing signal strength as indicated, for example, by a Received Signal Strength Indicator (RSSI) during a connection to an access point, that client device may perform a scan and transmit probe packets to determine whether a different access point (e.g., authenticator) would provide a better signal strength. Herein, "client device" and "supplicant" may be used interchangeably, and "access point" and "authenticator" may be used interchangeably. Causes of the decreasing signal strength may be attributed to the client device moving farther away from the access point, or a compromised ability of the access point to broadcast signals. After the client device detects a different access point that provides better signal strength, the client device commences an association process with the different access point, a process known as roaming.

The IEEE 802.11i and 802.11r protocols streamline roaming by obviating the need to perform an entire authentication process between the supplicant and the authenticator as long as the supplicant has been previously successfully authenticated at the authenticator within a threshold timeframe. Rather, a simple 4-way communication may be conducted between the supplicant and the authenticator to derive encryption keys to reassociate the supplicant to the authenticator. Upon completion of the 4-way communication, the supplicant may exchange encrypted data using the authenticator, thereby conserving time and processing resources. A virtual control port which previously was blocking traffic between the supplicant and the authenticator may be opened, permitting flow of encrypted traffic. In some embodiments, an authentication server, such as a Remote Authentication Dial-In User Service (RADIUS) server, may process authentication requests from the supplicant or from the authenticator, or alternatively, transmit the authentication requests to a separate authentication system or device, such as a domain controller. However, the authentication server may not actually participate in the 4-way communication, and or the generation of keys.

Prior to the 4-way communication, a precursor key, such as a Pairwise Master Key (PMK)-R1 may be derived, by the authenticator, from a PMK-R0, under the IEEE 802.11r protocol. Alternatively, another server that has been provided the PMK-R0 may derive the PMK-R1. A PMK-R1 may be unique to a particular supplicant and authenticator; a different client device attempting to authenticate to a particular supplicant may cause generation of a unique PMK-R1. PMK-R1s may be exchanged, via synchronization, among different authenticators, or access points. During the 4-way communication, a PMK-R1, which is derived from a PMK-R0, may be used to derive or establish transient encryption keys, including a Pairwise Transient Key (PTK) and a Group Transient Key (GTK). The authenticator may cache the PMK-R1. The PTK may be derived, at both the authenticator and the supplicant, using a pseudo-random function (PRF), the PMK-R1, an authenticator nonce, a supplicant nonce, a media access control (MAC) address of the authenticator, and a MAC address of the supplicant. Once the supplicant receives the authenticator nonce from the authenticator, the supplicant may generate the PTK. Next, the supplicant may transmit its nonce to the authenticator in order for the authenticator to generate a matching PTK. The authenticator may then generate the GTK. The authenticator may transmit the GTK to the supplicant. During the transmission, the GTK may be encrypted using the PTK. The PTK may be used to encrypt unicast frames specifically between the supplicant and the authenticator, while the GTK may be used to encrypt multicast or broadcast frames among the authenticator and multiple supplicants. In other words, the GTK may be shared among all client devices associated with a single access point.

The roaming process may be made even more streamlined because the authenticator may already have the PMK-R1 stored or cached, thus saving time that would otherwise be consumed by deriving the PMK-R1. This storage or caching of the PMK-R1 may stem from the aforementioned synchronization of PMK-R1s. In some examples, the PMK-R1s may be synchronized among all radiofrequency (RF) neighbors of an access point. During the synchronization, a service associated with the authenticator may compute PMK-R1s for each neighbor and transmit encoded messages, such as protobuf encoded messages, to the neighboring access points of the neighbor. The storage or caching of the PMK-R1 may extend for up to a threshold duration, such as eight hours. Additionally, the supplicant may also store or cache the corresponding PMK-R1 once received. As a result, interruptions or disturbances of features, such as Voice, may be prevented or reduced.

However, potential shortcomings of such an expansive storage or caching of PMK-R1s may include an increase in computing costs, bandwidth, and memory consumption, especially if a particular client device never, or rarely, roams to a particular access point. In particular, some deployments may have 80 or more RF neighbors per access point. In such a scenario, PMK-R1s would be synchronized with at least 80 different access points. Having to store or cache PMK-R1s at each access point may result in an overwhelming growth of tunnels, and excessive processing power required to generate cryptographic keys. Additionally, the increased sizes of cache tables on access points in such dense environments would consume additional memory, thereby further limiting an amount of memory available to store PMK-R1s. If available memory associated with the access points becomes limited, either due to cache table sizes or storage consumed by existing PMK-R1s, then further attempts to synchronize additional PMK-R1s to the access points may be unsuccessful. If additional PMK-R1s are not synchronized or cached at access points, the client devices associated with the additional PMK-R1s would likely experience additional latency and compromised quality of service during roaming. Media Access Control (MAC) randomization may further increase a storage footprint of the PMK-R1s because for each unique Service Set Identifier (SSID), a client device may use a different, randomized MAC address, and for each MAC address, the authenticator may generate a new PMK-R1. Therefore, a selective caching of PMK-R1s at access points would address the aforementioned shortcomings, while still maintaining a streamlined roaming process, as will be described in the foregoing FIGS.

FIG. 1A is an example illustration of a computing system 110 that streamlines a roaming process of client devices by selectively caching PMK-R1s that are most frequently deployed or utilized, most recently deployed or utilized, and/or most likely to be deployed or utilized, rather than indiscriminately caching PMK-R1s at the access points. In FIG. 1A, the computing system 110 may include a computing component 111 that includes one or more hardware processors that carry out functions to control or coordinate operations at one or more devices, such as access points 120, 130, and 140. In some embodiments, routers or other network devices may be implemented instead of the access points 120, 130, and 140. The computing component 111 may include a server, such as a remote server disposed separately from the network devices. As a result of the server being remote from the network devices, functions of authentication may be at least partially offloaded from the access points or controllers of the access points, thus reducing the respective loads of the access points and the controllers. Additionally, components of the computing system 110, unlike an operating system of the access points, may be easily updated or modified at any time, thus improving an efficiency and efficacy of the deployment. The computing component 111 may be associated with (e.g., connected electrically and/or physically to) a database 112 that stores protocols to perform functions by the computing component 111, such as authentication, and data generated by the computing component 111. The data generated may include keys generated by the computing component 111, frequencies of visits to each access point by different client devices within a network 100 as identified, for example, by serial numbers of visited access points by client devices, and/or RF data, such as path losses of neighboring access points corresponding to each of the client devices. In some examples, a visit may be construed as an association of a client device to an access point. An association may include an initial association (e.g., non-roaming) or an occurrence of roaming. In some embodiments, based on an available amount of memory, the computing component 111 may selectively delete one or more keys from the database 112. For example, if available memory is low, the computing component 111 may selectively delete keys from the database 112, based on a time at which the keys were most recently utilized for roaming. Thus, older keys, which have not been utilized or accessed for roaming, may be deleted first.

The computing component 111 may include logic 113 that includes instructions to carry out the functions of the computing component 111, which may include, generating a PMK-R0 once a particular client device (e.g., any of client devices 150, 160, or 170) successfully authenticates at an initial access point (e.g., the access point 120, 130, and/or 140). The initial access point is distinguished from a second access point to which the particular client device may roam. The computing component 111 may generate the PMK-R0 based on a Service Set Identifier (SSID) of a network, a mobility domain identifier (MDID), a media access control (MAC) address of the computing component 111, and a MAC address of the particular client device. The computing component 111 may generate the PMK-R0 based on a Master Session Key (MSK). The computing component 111 may store the PMK-R0. Other functions of the computing component 111 may include, generating a PMK-R1 corresponding to the initial access point. The computing component 111 may additionally determine, from remaining access points in a network, a subset of the remaining access points at which the PMK-R1s are to be generated. The subset of the remaining access points may be referred to as second access points. The second access points may be determined based on RF neighbor data such as path loss, a historical frequency, or a roaming history, at which the particular client device roams to each respective access point, a duration elapsed since a most recent roaming occurrence of the particular client device to each respective access point, and/or a probability that the particular client device will roam to each respective access point. The computing component 111 may further generate PMK-R1s at each of the second access points using the same PMK-R0. However, the PMK-R1 generated at each of the second access points may be unique. The computing component 111 may cache the generated PMK-R1s and distribute the PMK-R1s to each of the second access points.

The computing component 111 operates within a network 100 as illustrated in FIG. 1A. The network 100 includes the access points 120, 130, and 140. The network 100 also includes client devices 150, 160, and 170. Three access points and three client devices are shown merely for illustrative purposes; any number of access points and client devices may be included in the network 100. In general, the network may include x access points and y client devices, wherein x and y are positive integers. The access points 120, 130, and 140 may include one or more 2.4 GHz radios that communicate on a 2.4 GHz band, one or more 5 GHz radios that communicate on a 5 GHz band, and/or one or more 6 GHz radios that communicate on a 6 GHz band.

Each of the client devices 150, 160, and 170 may connect to one or more of the access points 120, 130, and 140 in order to transmit data through the network 100. Each of the client devices 150, 160, and 170 may freely roam through the network 100. In one scenario, if the client device 150 successfully authenticates to the access point 120, the computing component 111 may generate a PMK-R0. The computing component 111 may then derive a PMK-R1 specific to the access point 120 and transmit the PMK-R1 to the access point 120. The PMK-R0 may be stored at the database 112 associated with the computing 111. The PMK-R1 may be stored and/or cached at the access point 120. The computing component 111 may then selectively determine second access points (e.g., any of the access points 130 or 140, and/or additional access points) at which PMK-R1s are to be computed or generated, with respect to the access point 120, to which the client device 150 is currently connected and associated. As alluded to previously, the second access points are selected from, and include a subset of, remaining access points besides the access point 120 (i.e., the initial access point that the client device 150 associated with). A criteria of determining the second access points may include, historical frequencies at which the client device 150 accesses each of the access points 130 and 140, and/or path losses of each of the access points 130 and 140 with respect to the access point 120.

In some embodiments, the second access points may be selected from among RF neighbors of the access point 120 based on path losses between the access point 120 and the respective RF neighbors. More particularly, the determination of the second access points based on a path loss may be based on a highest value of a path loss among all RF neighbors of the access point 120, and/or a lowest value of a path loss among all RF neighbors of the access point 120. In some embodiments, the determination of the second access points includes, for the access point 120, sorting a list of all RF neighbors of the access point 120 based on path losses. Assuming that a lowest value of a path loss of all the RF neighbors is denoted as "j" and a highest value of a path loss of all the RF neighbors is "k," then the subset of the second access points may include all RF neighbors in which respective path losses relative to, or measured from, the access point 120, do not exceed $$j + \frac{(k-j)}{3}.$$

Thus, the second access points may be selected from among the RF neighbors of which the respective path losses between the RF neighbors and the access point are within $$j + \frac{(k-j)}{3}.$$

Here, the subset of the second access points determined based on a path loss according to the aforementioned criteria may be denoted as "m." In other words, the subset "m" includes all access points in which respective path losses to the access point 120 are within $$j + \frac{(k-j)}{3}.$$

because a pain loss may be related to relative location or distance between access points, this criteria takes into account relative distances between access points in assessing a likelihood or probability that a client device will roam to a particular access point from an initial access point.

In some examples, the determination of the second access points may, alternatively or additionally to the path loss criteria, include other RF neighbors of the access point 120 that have previously been visited. Thus, the second access points may, additionally or alternatively, include RF neighbors of the access point 120 that have previously been visited, denoted as "n." In other examples, the second access points may include RF neighbors of the access point 120 that have previously been visited within a threshold duration, such as during a past month, within a specified duration, such as, within the last ten days, and/or at least a threshold frequency or number of times. Thus, the subset "n" may be determined based on an intersection of a first subset, from access points in the network 100 besides the access point 120, that includes RF neighbors of the access point 120, and a second subset, from the access points in the network 100 besides the access point 120, that includes access points at which the client device 150 has associated to within the specified duration (e.g., during a previous time window). The RF neighbors of the access point 120 that have previously been visited, denoted as "n," may be updated at periodic intervals, such as, once a day. Thus, the determination of the second access points may be redetermined or refreshed at periodic intervals, such as once a day, as well.

In some examples, the second access points may include, or be selected based on, a union of m and n, while removing any instances of double counting if a particular access point were included in both m and n. For example, if the access point 140 satisfied the path loss criteria, and was previously visited, the access point 140 would be included in both m and n, but would not be counted twice so that the computing component 111 would avoid providing the PMK-R1 to the access point 140 twice. By incorporating a union of m and n, the criteria incorporates an assumption that access points at which roaming is most likely are determined based on path loss or distance criteria, and previously associated access points at which roaming has previously occurred. For example, factors besides distance or path loss may also contribute in determining which access points roaming will, or may, occur at. In particular, an access point may be a frequent target for roaming for reasons besides distance or proximity, because of certain attributes or capabilities of that access point, such as, transmitting using a 6 GHz band, or, a particular destination that is frequently visited by a particular user of a client device. In some embodiments, if storage of the PMK-R1s at a particular access point consumes more than a threshold space, the computing component 111 may refrain from generating additional PMK-R1s corresponding to that access point, and/or delete existing PMK-R1s based on a lowest frequency of usage and/or a longest duration since a most recent usage. Here, usage may be construed as a client device attempting to roam to that access point, and being authenticated using the corresponding PMK-R1 to that access point. For example, the computing component 111 may determine a time at which a most recent request from the client device to associate or reassociate to that access point occurred, determine whether a threshold period of time has elapsed since the most recent request or successful request, and in response to determining that a threshold period of time has elapsed, deleting the PMK-R1 from a cache associated with that access point.

The aforementioned process may be repeated for other client devices that have authenticated within the network. For example, if the client device 160 were successfully authenticated to the access point 130, the computing component 111 may determine second access points based on path loss criteria with respect to the access point 130, instead of the access point 120 as in the above scenario. In particular, the list of all RF neighbors, the lowest value of path loss, and the highest value of path loss, would be determined with respect to the access point 130. Additionally, the previously visited access points would be determined specifically for the client device 160. Any additional PMK-R1s generated by the computing component 111 using the aforementioned manner may be transmitted to the access point 130.

Figure 1B:
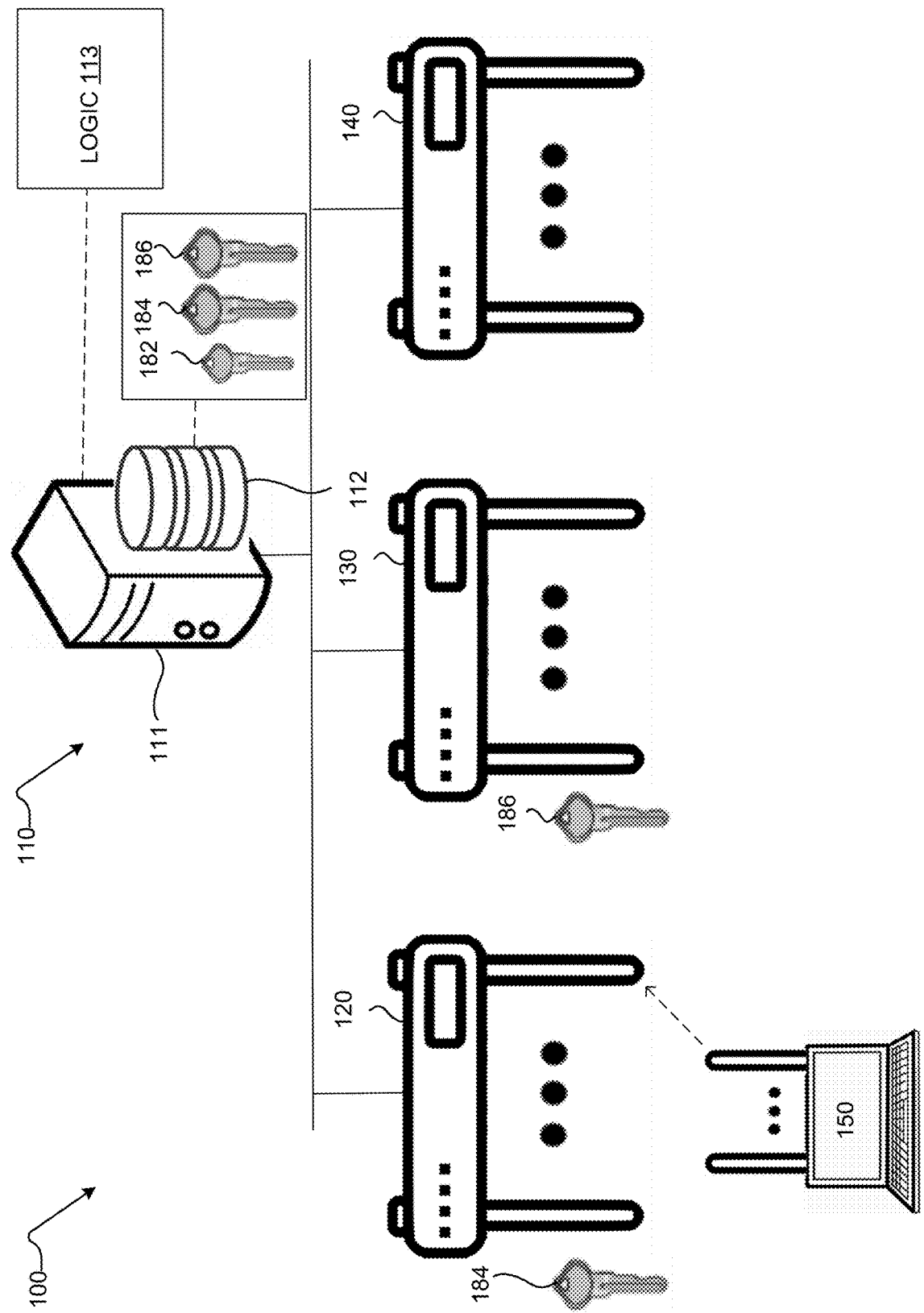
FIG. 1B is an example of a computing system that facilitates roaming of client devices by selectively caching a precursor key that generates additional keys to encrypt data, so that the precursor key is available when a client device reassociates to a new access point, according to embodiments described in the present disclosure. During the selective caching, the computing system determines at which access points a precursor key is to be generated.
Figure 1C:
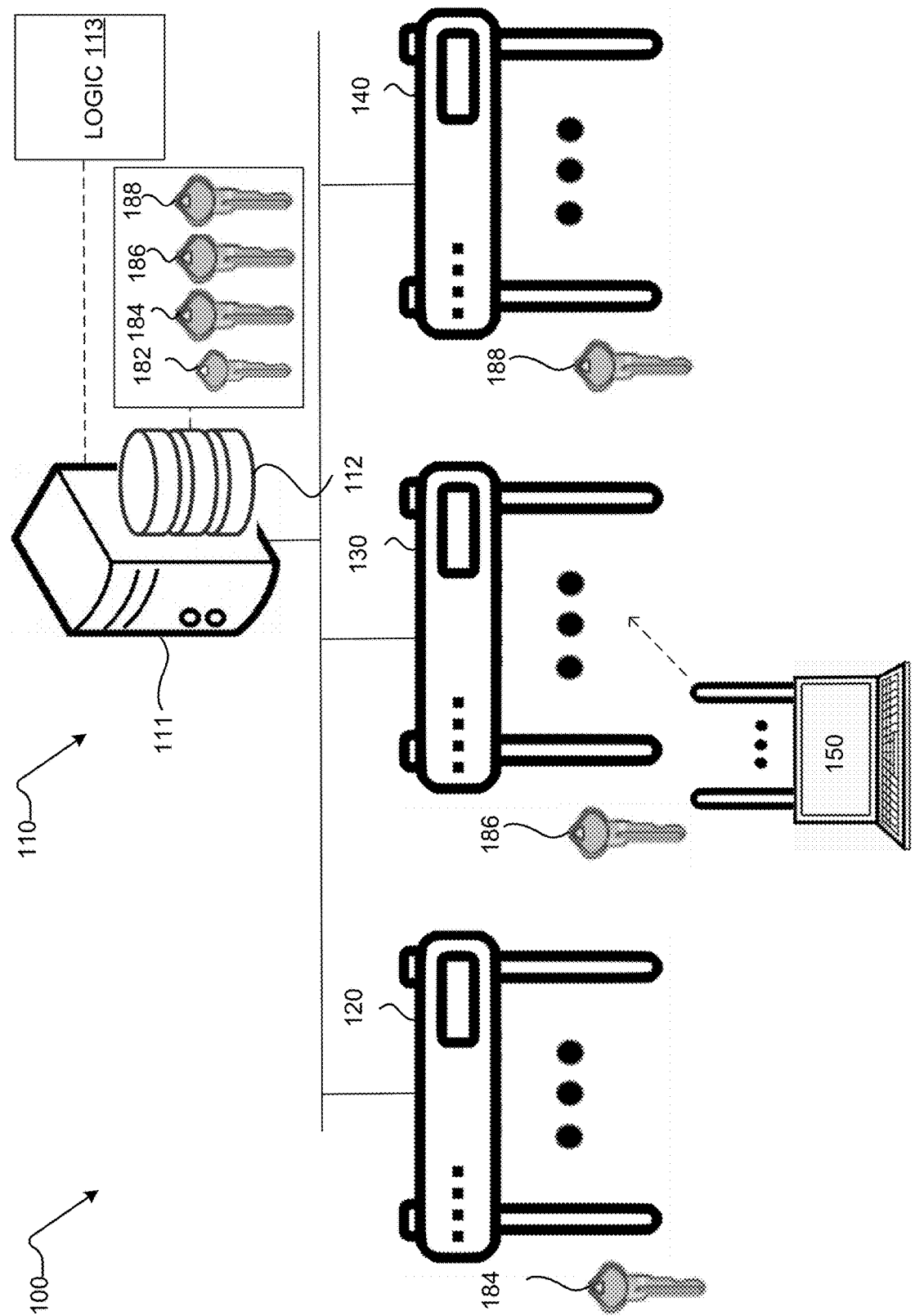
FIG. 1C is an example of a computing system that facilitates roaming of client devices, according to embodiments described in the present disclosure.

After each successful roaming operation of the client device 150, the second access points may be redetermined with respect to the current access point connected to the client device 150, and additional PMK-R1s may be generated for the additional access points newly determined to fall under the second access points. Such a scenario is illustrated in FIGS. 1B and 1C. As illustrated in FIG. 1B, the client device 150 may initially authenticate with the access point 120. Only one client device is illustrated in FIG. 1B for the sake of simplicity, but the foregoing description may additionally apply to any other client devices within the network 100. The computing component 111 may generate a PMK-R0 182. The computing component 111 may then generate a PMK-R1 184 using the PMK-R0 182, and transmit the PMK-R1 184 to the access point 120, which may store or cache the PMK-R1 184. The computing component 111 and/or the access point 120 may transmit the PMK-R1 184 to the client device 150. The computing component 111 may then determine which remaining access points within the network 100 are second access points, at which PMK-R1s are to be generated, using the criteria as described with respect to FIG. 1A. For the sake of illustration, assume that the computing component 111 determines that the access point 130 is a second access point, but that the access point 140 is not a second access point, because the access point 140 has not been visited by the client device 150, and that the access point 140 fails to satisfy the path loss criteria. In particular, the access point 140 may have a path loss, relative to, or measured from, the access point 120, that exceeds $$j + \frac{(k-j)}{3},$$

where j and k denote a lowest value of path loss of the RF neighbors of the access point 120, and a highest value of path loss of the RF neighbors of the access point 120, respectively. The computing component 111 would generate a PMK-R1 186 using the same PMK-R0 182, and transmit the PMK-R1 186 to the access point 130, which stores the PMK-R1 186. However, no PMK-R1 would be generated for the client device 140. The PMK-R1 186 and the PMK-R1 184 are different keys, because each PMK-R1 is unique to a particular client device and a particular access point. A lifetime of the PMK-R0 182 may be approximately eight hours, after which a new PMK-R0 may be generated.

In FIG. 1C, the client device 150 may initiate a reassociation request to roam to the access point 130. Upon the successful roaming of the client device 150, the computing component 111 may update its determination of second access points. In particular, the computing component 111 may redetermine which of the RF neighbors of the access point 130 satisfy a path loss with respect to the access point 130, to which the client device 150 is currently connected. In contrast, the computing component 111, in FIG. 1B, determined the RF neighbors and path loss with respect to the access point 120, which is the access point to which the client device 150 was connected at that time. The computing component 111 may determine that the access point 140 now satisfies the path loss criteria with respect to the access point 130. In particular, the access point 140 may have a path loss, relative to, or measured from, the access point 130, that is within $$j + \frac{(k-j)}{3},$$

where j and k denote a lowest value of path loss among the RF neighbors of the access point 130, and a highest value of path loss of the RF neighbors among the access point 130, respectively. Therefore, the computing component 111 may generate a PMK-R1 188 for the access point 140, using the same PMK-R0 182, and transmit the PMK-R1 188 to the access point 140, which may cache the PMK-R1 188. The computing component 111 would refrain from generating another PMK-R1 corresponding to the access point 130 because the access point 130 already has the PMK-R1 186.

FIG. 2 illustrates a scenario of a network 200, which may be implemented in a same or similar manner compared to the network 100, except that one of the access points, the access point 140, has become inactivated either permanently or temporarily. The inactivation, whether permanent or temporary, may cause the access point 140 to no longer satisfy the path loss criteria because no signal from the access point 140 is detectable any longer. However, the computing component 111 may distinguish between the access point 140 being inactivated permanently or temporarily. If the access point is inactivated permanently, the access point 140 would not be visited by any client devices, meaning that following a threshold duration, the access point 140 would excluded from the set n for all client devices. Thus, because the access point 140 would neither satisfy the path loss criteria nor belong to the set n, the access point 140 would not fall under the second access points. Meanwhile, if the access point 140 were only inactivated temporarily, eventually, once the access point 140 is restored, client devices may still visit, or roam to, the access point 140, in which scenario the access point 140 may still be included within the set n.

In some embodiments, a user may manually remove the access point 140 from a history of visited access points if the user knows that the access point 140 has been permanently inactivated or disabled. In some embodiments, the computing component 111 may generate an alert that the access point 140 may have been inactive for at least a threshold duration of time, if no path loss data has been detected for the access point 140 for over a threshold duration, and receive feedback indicating whether the access point 140 has been excluded from the network 100, and/or whether the access point has been permanently disabled, inactivated, malfunctioned, or left the network 100. In response to a positive feedback, that the access point 140 has been excluded from the network 100, the computing component 111 may remove the access point 140 from a history of visited access points at all remaining access points in the network 200. The computing component 111 may further recompute path loss data corresponding to the remaining access points, according to the criteria described in reference to FIGS. 1A, 1B, and 1C, taking into account that the access point 140 would no longer be considered as a candidate of having a lowest path loss j or a highest path loss k among all RF neighbors of a particular access point. If the access point 140 did correspond to a lowest path loss j or a highest path loss k among all RF neighbors of a particular access point, then the lowest path j or the highest path loss k would be recomputed as a next lowest path loss or a next highest path loss. Therefore, the recomputed, or updated, path losses between the respective RF neighbors and an access point (e.g., the access point 120 or 130), takes into account that the access point 140 has been excluded. Additionally, the computing component 111 determines the second access points based on the recomputed, or updated, path losses.

Figure 3:
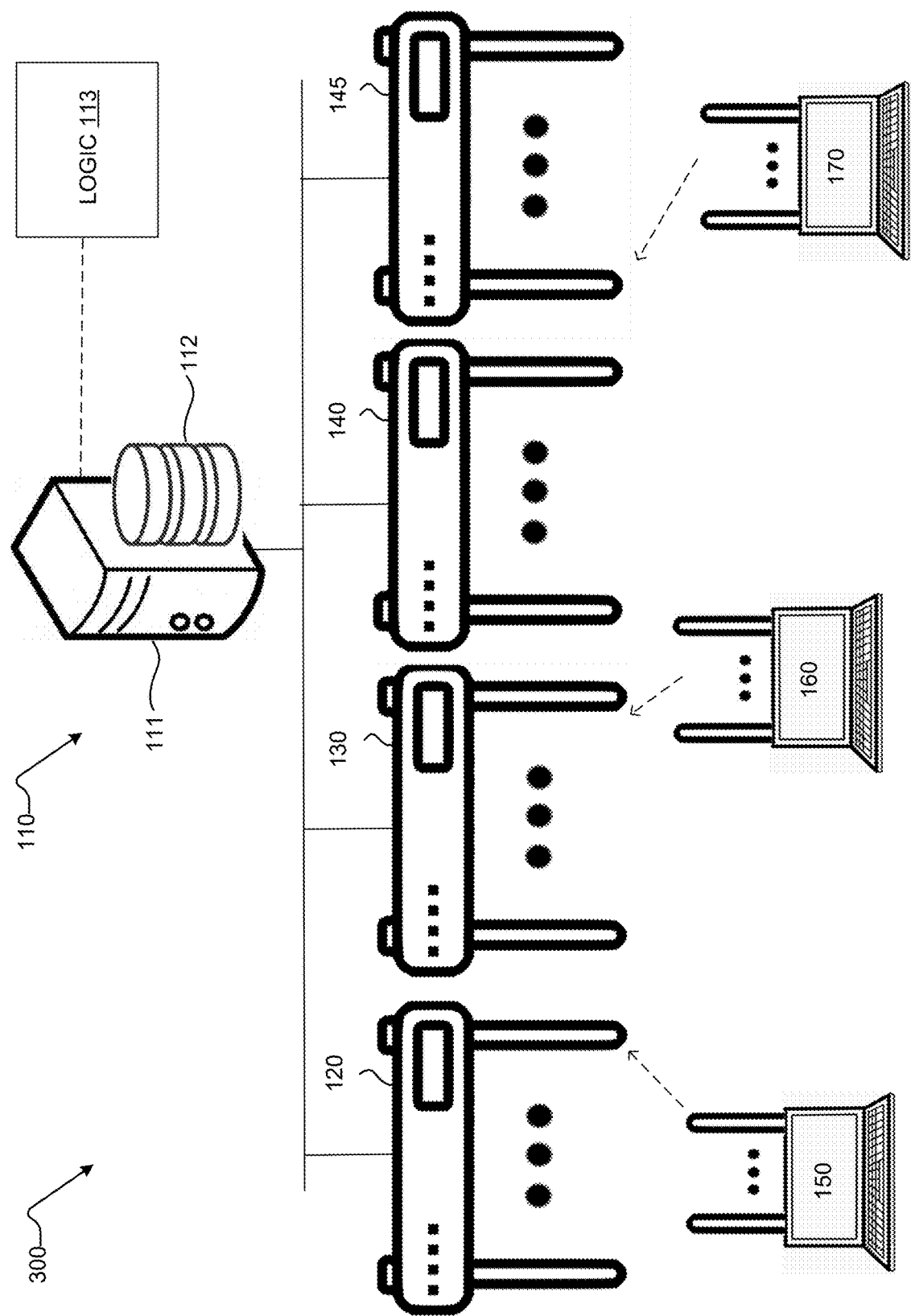
FIG. 3 is an example of a computing system that facilitates roaming of client devices, according to embodiments described in the present disclosure.

FIG. 3 illustrates a scenario of a network 300, which may be implemented in a same or similar manner compared to the network 100, except that a new access point, access point 145, has been added. In such a scenario, the access point 145 would be taken into consideration as part of the path loss criteria described in reference to FIGS. 1A, 1B, and 1C. The access point 145 may satisfy the path loss criteria with respect to nearby access points, such as the access point 140. If the access point 145 were to be visited by client devices, the access point 145 may also be included in the set n for those client devices. Therefore, using the aforementioned criteria as described with respect to FIGS. 1A, 1B, and 1C, the computing component 111 would also account for new access points within the network 300 in determining whether to generate and transmit PMK-R1 keys.

Figure 4:
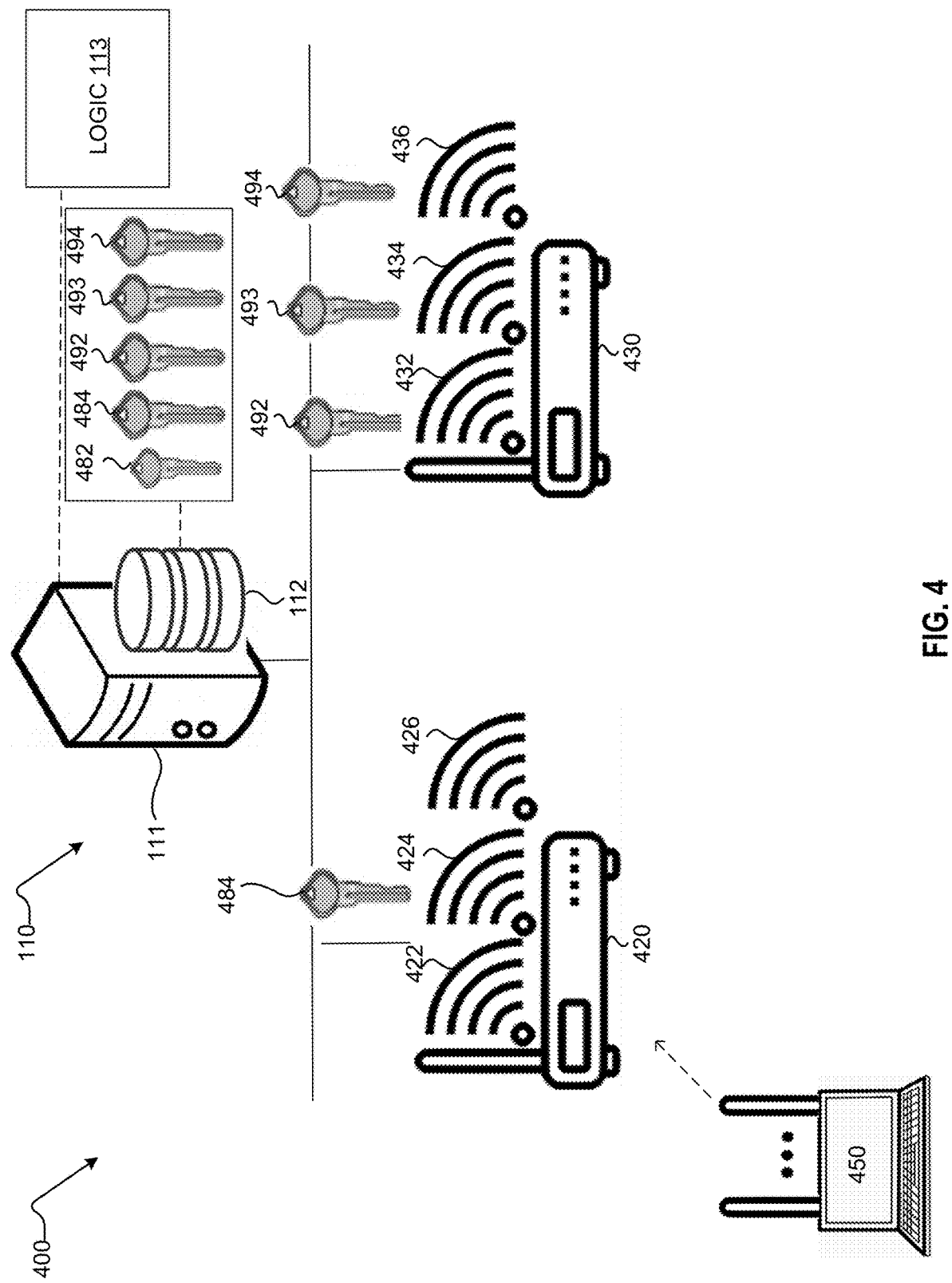
FIG. 4 is an example of a computing system that facilitates roaming of client devices, according to embodiments described in the present disclosure.

FIG. 4 illustrates a scenario in which at least a subset of the access points in a network 400 has radios operating on different bands or sub-bands of frequencies. For example, in a network 400, an access point 420 may include any of a radio 422 operating or communicating on a 2.4 GHz band, a radio 424 operating or communicating on an upper or lower 5 GHz band, and a radio 426 operating or communicating on a 6 GHz band. Similarly, an access point 430 may include any of a radio 432 operating or communicating on a 2.4 GHz band, a radio 434 operating or communicating on an upper or lower 5 GHz band, and a radio 436 operating or communicating on a 6 GHz band. Assuming that the client device 450 connects to, and is authenticated at, the radio 424 that operates on a 5 GHz band, the computing component 111 may generate a PMK-R0 482, and a PMK-R1 484 specific for the 5 band. Because a Basic Service Set Identifiers (BSSIDs) or MAC addresses corresponding to each radio is different, and PMK-R1s are generated in part based on the BSSIDs, PMK-R1s would be uniquely generated for each separate radio. For example, the computing component 111 may generate different PMK-R1s 492, 493, and 494, respectively, corresponding to the radios 432, 434, and 436, assuming that the radios 432, 434, and 436 satisfied a path loss criteria with respect to the radio 422 of the access point 420 and/or have previously been accessed or visited during roaming of the client device 450, according to the criteria described in reference to FIGS. 1A, 1B, and 1C. Therefore, the computing component 111 may compute different PMK-R1s corresponding to different radios of the access point, the different radios operating on different frequency bands. Other features described in reference to FIGS. 1A, 1B, 1C, 2, and 3 may also be applicable to the network 400 of FIG. 4.

Figure 5:
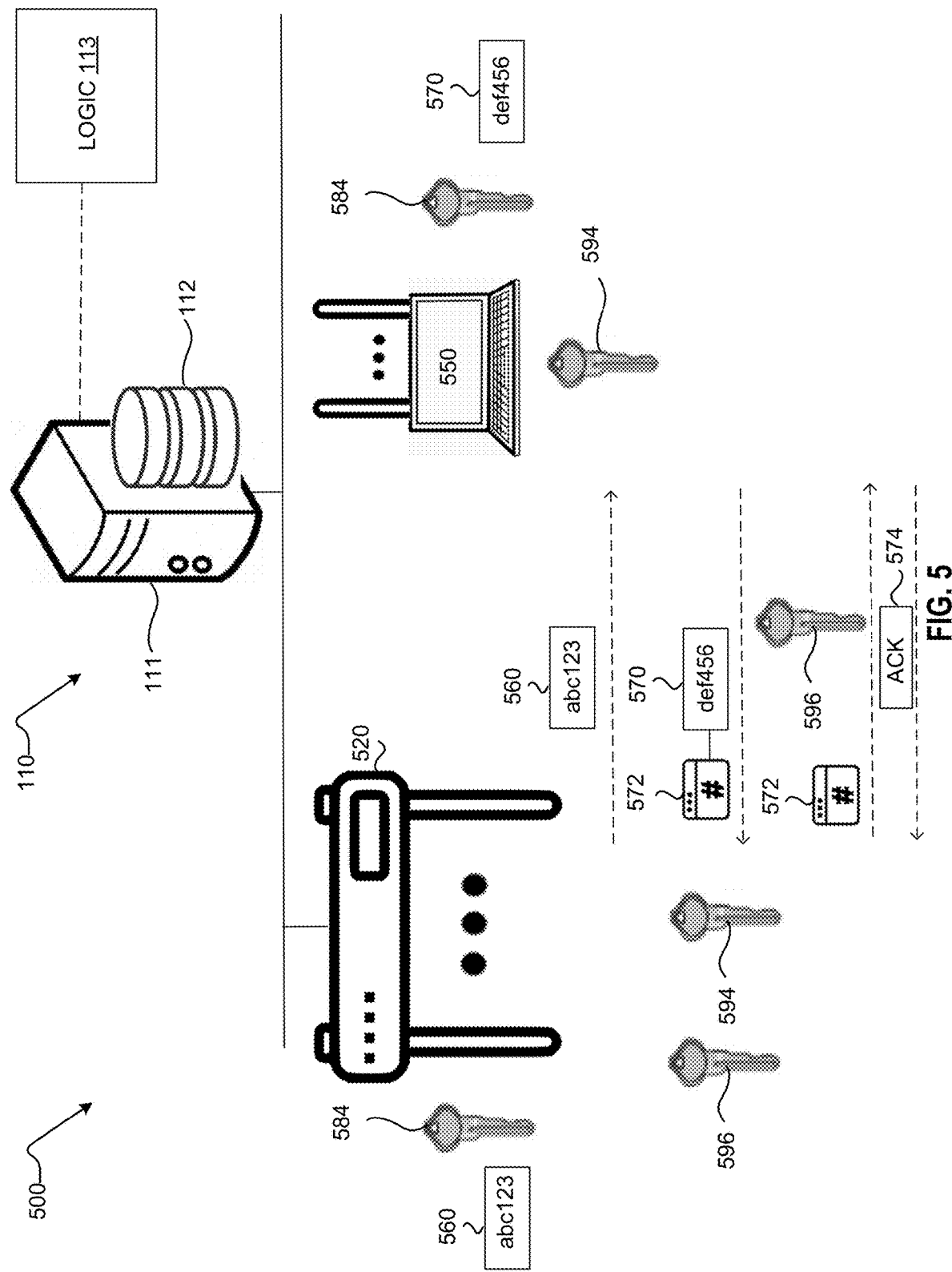
FIG. 5 is an example of a computing system that facilitates roaming of client devices, according to embodiments described in the present disclosure.

FIG. 5 illustrates a scenario, following the generation of the PMK-R1s, of generating additional keys that facilitate the transmission of encrypted data between an access point and a client device. Authentication of a client device to an access point may be completed following the generation of the PMK-R1s. The completion of the authentication may include, transmitting a nonce to the client device in order for the client device to independently generate a transient key (e.g., a PTK), receiving a second nonce from the client device, generating the transient key based in part on the nonce and the second nonce. Therefore, once the computing component 111 receives a request, at a corresponding access point, from the client device, to access a data packet, the computing component 111 encrypts the data packet using the transient key, and transmits the data packet to the client device, as will be described in additional detail below. In FIG. 5, the computing component 111 may generate a PMK-R0 582, and a PMK-R1 584. The computing component 111 may transmit the PMK-R0 582 and the PMK-R1 584 to an access point 520. Only one access point is illustrated for the sake of simplicity. The access point may be implemented as the access point 120 or the access point 420. The access point 520 may transmit the PMK-R1 584 to a client device 550, which may be implemented as the client device 150 or the client device 550. The access point 520 may also transmit a nonce 560 to the client device 550. The client device 550 may generate a PTK 594 using the nonce 560 received from the access point 520, a nonce 570 generated by the client device 550, a MAC address of the client device 550, and the MAC address of the access point 520, which the client device 550 already knows. The generation of the PTK 594 may involve a PRF. Once the client device 550 generates the PTK 594, the client device 550 transmits the nonce 570 to the access point 520. The client device 550 may also transmit a message integrity check (MIC) 572 which may include a cryptographic hash to confirm a veracity of the PTK 594 that will be generated by the access point 520 or the computing component 111. The MIC 572 may have been generated using at least a portion of the PTK 594. The access point 520 generates the PTK 594 using the nonce 560, the nonce 570 generated by the client device 550, the MAC address of the client device 550, and the MAC address of the access point 520. The access point 520 or the computing component 111 then generates a MIC, using at least a portion of the PTK 594. The access point 520 or the computing component 111 verifies whether the MIC generated matches the MIC 572. If so, the access point 520 or the computing component 111 authenticates the client device 550. The access point 520 or the computing component 111 then generates a GTK 596, and transmits the GTK 596 and the generated MIC (identical to the MIC 572) to the client device 550. The client device 550 provides a final acknowledgement 574. As a result, the client device 550 and the access point 520 are now equipped with all keys to securely transmit encrypted data packets. Selectively caching PMK-R1s, as described in reference to FIGS. 1A, 1B, 1C, 2, 3, and 4, expedites the process of generating, transmitting, and verifying keys to encrypt data packets, thereby streamlining a roaming process for client devices.

Figure 6:
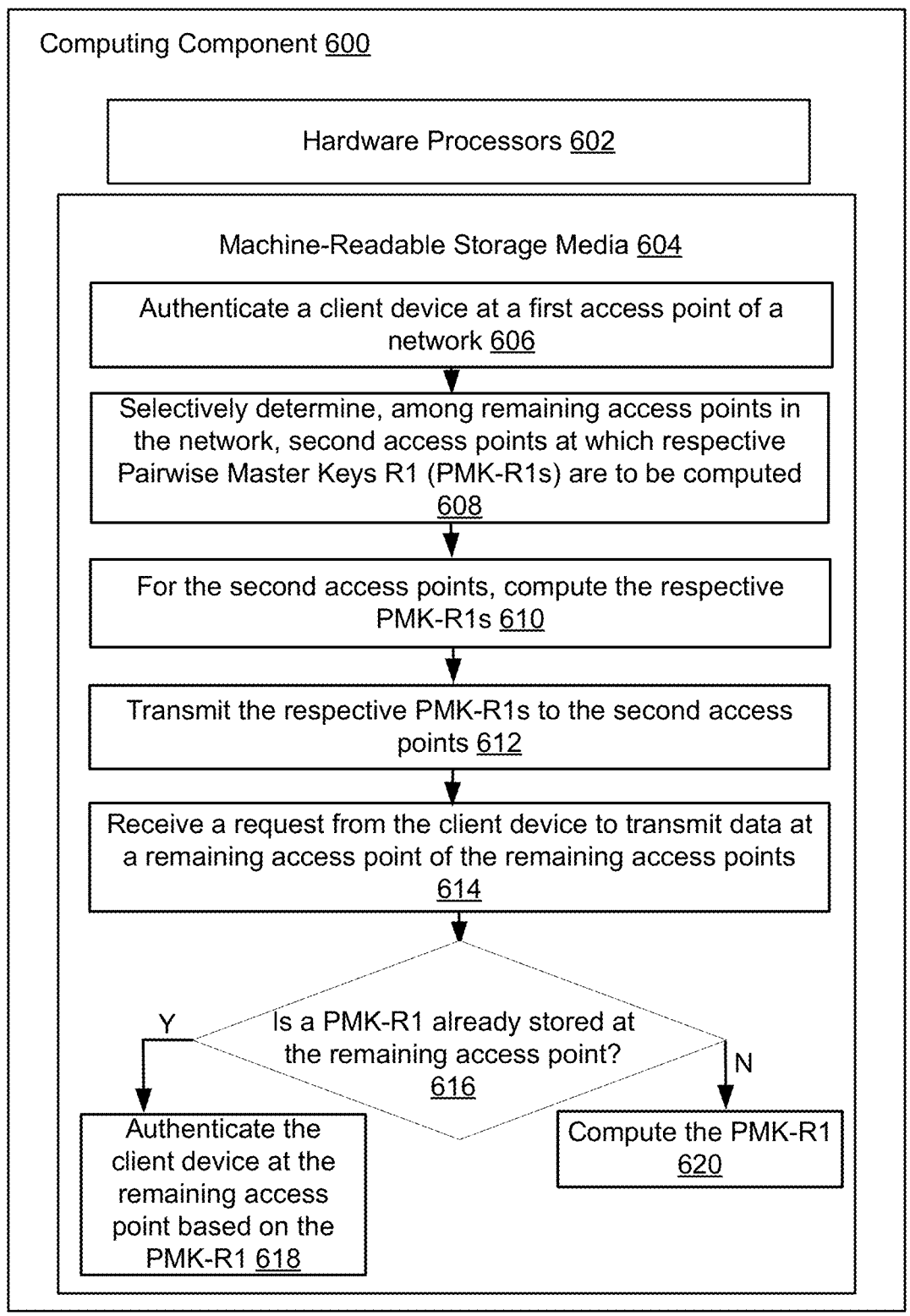
FIG. 6 is an example illustration depicting how a computing component facilitates roaming of client devices, according to embodiments described in the present disclosure.

FIG. 6 illustrates a computing component 600 that includes one or more hardware processors 602 and machine-readable storage media 604 storing a set of machine-readable/machine-executable instructions that, when executed, cause the hardware processor(s) 602 to perform an illustrative method of selectively caching and deriving precursor keys, such as PMK-R1s, corresponding to selected access points and/or client devices. It should be appreciated that there can be additional, fewer, or alternative steps performed in similar or alternative orders, or in parallel, within the scope of the various embodiments discussed herein unless otherwise stated. The computing component 600 may be implemented as the computing component 111 of FIGS. 1A, 1B, 1C, 2, 3, 4, and/or 5. The computing component 600 may include a server. The machine-readable storage media 604 may include suitable machine-readable storage media described in FIG. 7.

At step 606, the hardware processor(s) 602 may execute machine-readable/machine-executable instructions stored in the machine-readable storage media 604 to authenticate a client device at a first access point of a network, such as the network 100 of FIGS. 1A, 1B, or 1C, the network 200 of FIG. 2, the network 300 of FIG. 3, the network 400 of FIG. 4, or the network 500 of FIG. 5. The authentication may be in response to an initial request from the client device to access a network, for example, the client device 150 requesting access to the access point 120 in FIGS. 1A and 1B.

Next, at step 608, the hardware processor(s) 602 may selectively determine, among remaining access points in the network, second access points at which respective Pairwise Master Keys R1 (PMK-R1s) are to be computed. In other words, the PMK-R1s may be computed at a second access point prior to the client device reassociating at the second access point to reduce or eliminate delays or latency. The delays or latency may be a result of the client device waiting for the PMK-R1s to be computed following a request to reassociate at the second access point. In reference to FIG. 1B, the hardware processor(s) 602 may determine whether a PMK-R1 is to be computed at any of the remaining access points 130 and 140. The criteria for such a determination may include any of respective path losses from the first access point to the second access points and respective historical frequencies at which the client device associates at the respective remaining access points, as described in reference to FIGS. 1A, 1B, and 1C. In particular, in reference to FIG. 1B, path losses may be computed between the access point 120 and the access point 130, and between the access point 120 and the access point 140. The respective historical frequencies may indicate whether, and/or how often, the client device 150 has requested an association or a reassociation at each of the access points 130 and 140 within a given time interval or window. In FIG. 1B, the access point 140 may fail to satisfy a path loss criteria (being farther away from the access point 120), and may not have been visited by (e.g., received a request to associate or reassociate from) the client device 150 within the given time interval. Thus, the access point 140 may not qualify as a second access point, and no PMK-R1 would be generated for the access point 140. However, the access point 130 may qualify as a second access point, because the access point 130 may have been visited by the client device 150 within the given time interval, and/or satisfies the path loss criteria. Thus, the hardware processor(s) 602 may determine that a PMK-R1 is to be computed for the access point 130. The hardware processor(s) 602 may update a determination of the second access points following access points being excluded from the network, as illustrated in FIG. 2, and following new access points entering the network, as illustrated in FIG. 3. For example, access points may be excluded from the network due to inactivation, malfunction, or leaving the network.

Next, at step 610, the hardware processor(s) 602 may compute the PMK-R1s for each of the second access points. For example, in reference to FIG. 1B, the hardware processor(s) 602 would compute the PMK-R1 186 for the access point 130. The PMK-R1s may be computed from PMK-R0s stored by the hardware processor(s) 602. Following the computation, in step 612, the hardware processor(s) 602 may transmit the respective PMK-R1s to the second access points to be cached at the second access points. Again, in FIG. 1B, the access point 130 would receive the PMK-R1 186. In step 614, the hardware processor(s) 602 may receive a request from the client device to transmit data at a remaining access point of the remaining access points. For example, in reference to FIG. 1B, the client device 150 may request to transmit data, or reassociate to, the access point 130, instead of via the access point 120.

In decision 616, the hardware processor(s) 602 may determine whether a PMK-R1 corresponding to the client device has already been stored at the remaining access point. In reference to FIG. 1B, the access point 130 already has a PMK-R1 stored within. Therefore, in step 618, the hardware processor(s) 602 may authenticate the client device at the remaining access point without needing to compute the PMK-R1 following the request to reassociate by the client device. An exemplary authentication procedure is illustrated in FIG. 5. Following the authentication, the client device may transmit encrypted data via the access point. However, if the hardware processor(s) 602 determine, in decision 616, that no PMK-R1 has been stored at the remaining access point, then the hardware processor(s) 602 would compute a PMK-R1 corresponding to the remaining access point, in step 620, so that the client device may be authenticated at the remaining access point. Additionally, following the authentication at the remaining access point, the hardware processor(s) 602 may update determinations of path losses based on the remaining access point, and update the determination of the second access points based on the remaining access point, as illustrated in FIG. 1C. For example, if the client device has not previously visited (e.g., requested an association or reassociation to) the remaining access point, the hardware processor(s) 602 may incorporate the remaining access point into the subset m, as described in reference to FIG. 1A. Any subsequent determination of which access points to generate PMK-R1s may be based on an assumption that the remaining access point has been visited or accessed.

Figure 7:
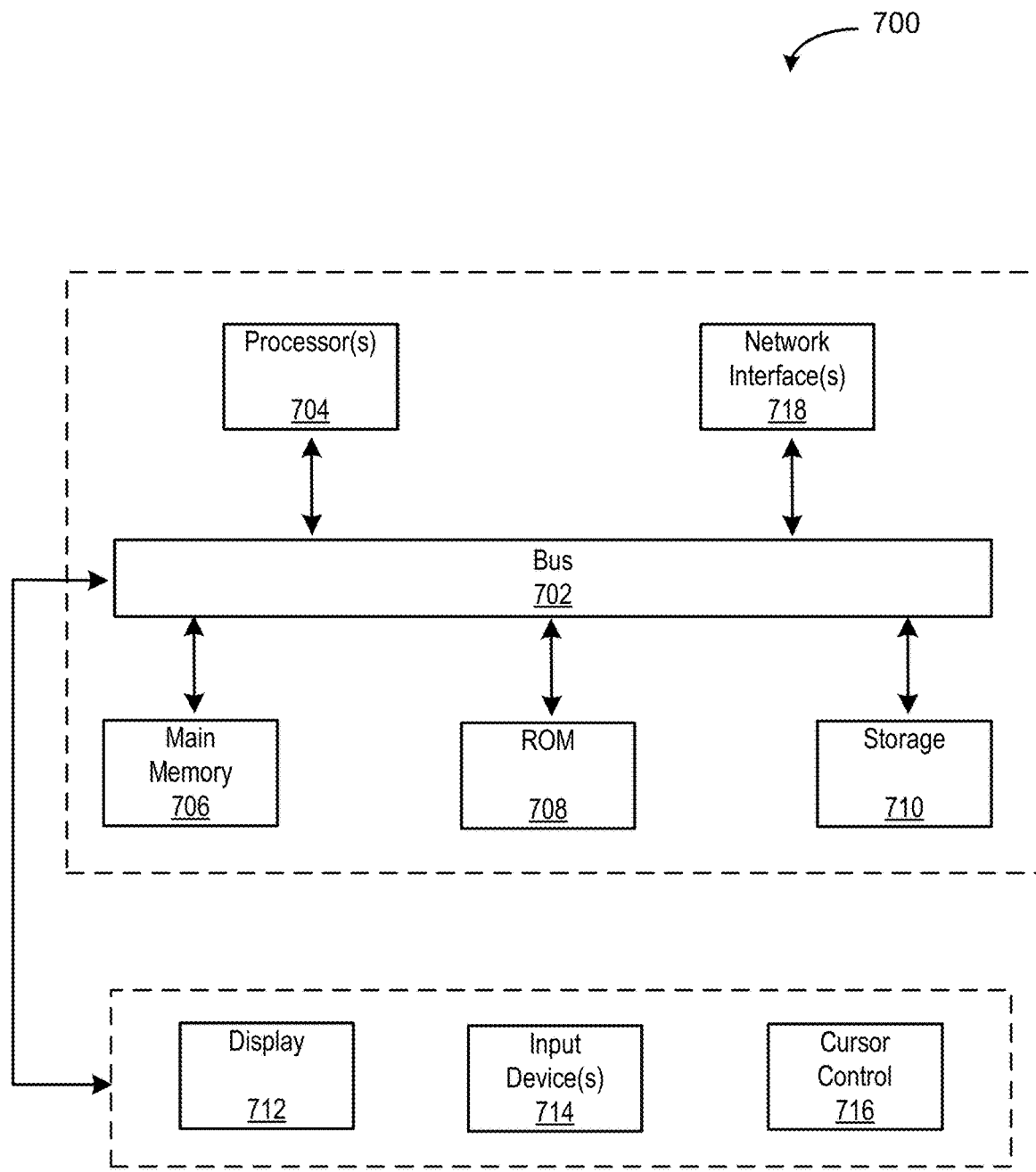
FIG. 7 is an example computing component that may be used to implement various features of embodiments described in the present disclosure.

FIG. 7 depicts a block diagram of an example computer system 700 in which various of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "component," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Network interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicated with a WAN). Wireless links may also be implemented. In any such implementation, network interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

Unless the context requires otherwise, throughout the present specification and claims, the word "comprise" and variations thereof, such as, "comprises" and "comprising"

are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

What is claimed is:

1. A computer-implemented method, comprising:
   authenticating a client device at a first access point of a network;
   selectively determining, among remaining access points in the network, second access points at which respective precursor keys are to be computed, based on at least one of:
      respective path losses from the first access point to the second access points; and
      respective historical frequencies at which the client device associates at the respective remaining access points;
   for the second access points, computing the respective precursor keys;
   transmitting the respective precursor keys to the second access points to be cached at the second access points;
   receiving a request from the client device to reassociate to a second access point of the second access points; and
   authenticating the client device at the second access point based on a precursor key corresponding to the second access point, thereby permitting encrypted data transmission between the client device and the second access point.

2. The computer-implemented method of claim 1, wherein the computation of the respective precursor keys comprises computing different precursor keys corresponding to different radios of the first access point, the different radios operating on different frequency bands.

3. The computer-implemented method of claim 1, wherein the precursor keys comprise PMK (Pairwise Master Key)-R1s; and
   the historical frequencies indicate whether the client device has associated at the respective remaining access points within a previous time window.

4. The computer-implemented method of claim 3, wherein the selection of the second access points is based on an intersection of a first subset, from the remaining access points, comprising radiofrequency (RF) neighbors of the first access point, and a second subset, from the remaining access points, comprising access points at which the client device has associated or reassociated to within the previous time window.

5. The computer-implemented method of claim 1, wherein the second access points are selected from among radiofrequency (RF) neighbors of the the access point based on path losses between the first access point and the respective RF neighbors.

6. The computer-implemented method of claim 5, wherein the second access points are selected from among the RF neighbors based on a highest path loss and a lowest path loss among the RF neighbors.

7. The computer-implemented method of claim 6, wherein the second access points are selected from among the RF neighbors of which the respective path losses between the RF neighbors and the first access point are within $$j + \frac{(k-j)}{3},$$

where j and k denote the lowest path loss and the highest path loss, respectively.

8. The computer-implemented method of claim 7, further comprising:
   receiving a notification that a remaining access point, out of the remaining access points, is excluded from the network; and
   in response to receiving the notification, determining updated path losses between the RF neighbors and the first access point, excluding the remaining access point; and
   determining the second access points based on the updated path losses.

9. The computer-implemented method of claim 4, wherein a third subset comprises the intersection of the first subset and the second subset; and the selection of the second access points is based on a union of the third subset and a fourth subset comprising the RF neighbors of which respective path losses between the RF neighbors and the first access point are within $$j + \frac{(k-j)}{3},$$

where j and k denote the lowest path loss and the highest path loss, respectively.

10. The computer-implemented method of claim 1, further comprising, for a second access point of the determined second access points:
    determining a time at which a most recent request from the client device to reassociate to the second access point occurred;
    determining whether a threshold period of time has elapsed since the most recent request; and
    in response to determining that a threshold period of time has elapsed, deleting the precursor key from a cache associated with the second access point.

11. A computing system comprising:
    one or more processors; and
    a memory storing instructions that, when executed by the one or more processors, cause the one or more processors to:
       authenticating a client device at a first access point of a network;
       selectively determining, among remaining access points in the network, second access points at which respective precursor keys are to be computed, based on at least one of:
          respective path losses from the first access point to the second access points; and
          respective historical frequencies at which the client device associates at the respective remaining access points;
       for the second access points, computing the respective precursor keys;

transmitting the respective precursor keys to the second access points to be cached at the second access points;

receiving a request from the client device to transmit data at a remaining access point of the remaining access points;

determining whether a precursor key corresponding to the client device has already been stored at the remaining access point; and in response to determining that a precursor key corresponding to the client device has already been stored, authenticating the client device at the remaining access point based on the precursor key corresponding to the client device, the authentication comprising:

transmitting a nonce to the client device in order for the client device to independently generate a transient key;

receiving a second nonce from the client device;

generating the transient key based in part on the nonce and the second nonce;

receiving a request, from the client device, to access a data packet;

encrypting the data packet using the transient key; and transmitting the data packet to the client device.

12. The computing system of claim 11, wherein the computation of the respective precursor keys comprises computing different precursor keys corresponding to different radios of the first access point, the different radios operating on different frequency bands.

13. The computing system of claim 11, wherein the precursor keys comprise PMK (Pairwise Master Key)-R1s; and the historical frequencies indicate whether the client device has associated at the respective remaining access points within a previous time window.

14. The computing system of claim 13, wherein the selection of the second access points is based on an intersection of a first subset, from the remaining access points, comprising radiofrequency (RF) neighbors of the first access point, and a second subset, from the remaining access points, comprising access points at which the client device has associated or reassociated to within the previous time window.

15. The computing system of claim 11, wherein the second access points are selected from among radiofrequency (RF) neighbors of the first access point based on path losses between the first access point and the respective RF neighbors.

16. The computing system of claim 15, wherein the second access points are selected from among the RF neighbors based on a highest path loss and a lowest path loss among the RF neighbors.

17. The computing system of claim 16, wherein the second access points are selected from among the RF neighbors of which the respective path losses between the RF neighbors and the first access point are within $$j + \frac{(k-j)}{3},$$

where j and k denote the lowest path loss and the highest path loss, respectively.

18. The computing system of claim 17, wherein the instructions further cause the processors to:

receive a notification that a second remaining access point, out of the remaining access points, is excluded from the network; and in response to receiving the notification, determining updated path losses between the RF neighbors and the first access point, excluding the second remaining access point; and determining the second access points based on the updated path losses.

19. The computing system of claim 14, wherein a third subset comprises the intersection of the first subset and the second subset; and the selection of the second access points is based on a union of the third subset and a fourth subset comprising the RF neighbors of which respective path losses between the RF neighbors and the access point are within $$j + \frac{(k-j)}{3},$$

where j and k denote the lowest path loss and the highest path loss, respectively.

20. The computing system of claim 11, wherein the instructions further cause the processors to:

determine a time at which a most recent request from the client device to reassociate to the second access point occurred;

determine whether a threshold period of time has elapsed since the most recent request; and in response to determining that a threshold period of time has elapsed, delete the precursor key from a cache associated with the second access point.

\* \* \* \* \*